United States Patent [19]

Clifford

[11] Patent Number: 4,735,572

[45] Date of Patent: Apr. 5, 1988

[54] PHYSICAL EDUCATION INSTRUCTIONAL GARMENT

[76] Inventor: Mona Clifford, 2186 A1A, Indian Harbour Beach, Fla. 32937

[21] Appl. No.: 804,082

[22] Filed: Dec. 3, 1985

[51] Int. Cl.$^4$ ............................................. G09B 19/00
[52] U.S. Cl. .................... 434/247; 434/250; D2/29
[58] Field of Search ............... 434/247, 250, 256, 257; 272/25, 119; D2/7, 29, 35, 37, 79; 40/586

[56] References Cited

U.S. PATENT DOCUMENTS

| | | | |
|---|---|---|---|
| D. 278,755 | 5/1985 | Jacobson | D2/29 |
| 3,258,858 | 7/1966 | Carifee, Jr. | 434/397 X |
| 3,353,282 | 11/1967 | Sneed | 434/257 |
| 3,453,746 | 7/1969 | Cartright | 434/257 |
| 3,484,974 | 12/1969 | Culmone | 40/586 |
| 4,015,344 | 4/1977 | Michaels et al. | 434/257 |
| 4,253,197 | 3/1981 | Posta | 434/260 X |
| 4,360,345 | 11/1982 | Hon | 434/262 |
| 4,508,510 | 4/1985 | Clifford | 434/247 |

OTHER PUBLICATIONS

Collegeville Costumes, 1976, p. 19.

*Primary Examiner*—William H. Grieb
*Attorney, Agent, or Firm*—Antonelli, Terry & Wands

[57] ABSTRACT

An illustrated garment for the instructional purpose of describing kinesthetic sensibility of certain actioning modality forms. The garment in the form of a close-fitting leotard covering the limbs and torso can be illustrated with diamonds and circles for the crystalline form of actioning modality or with cup-shaped markings for the kinespheric form of actioning modality or with oblong loop shapes for the kinetic form of actioning modality.

23 Claims, 8 Drawing Sheets

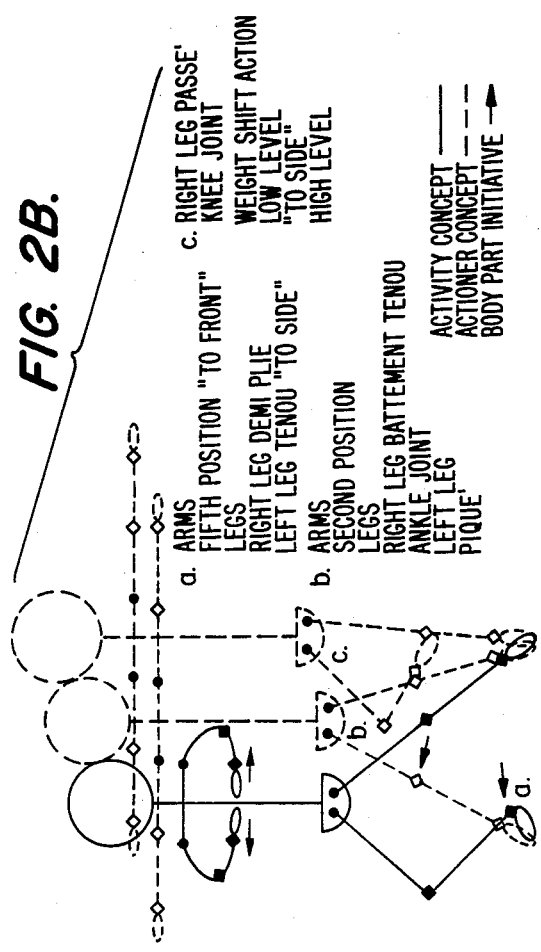
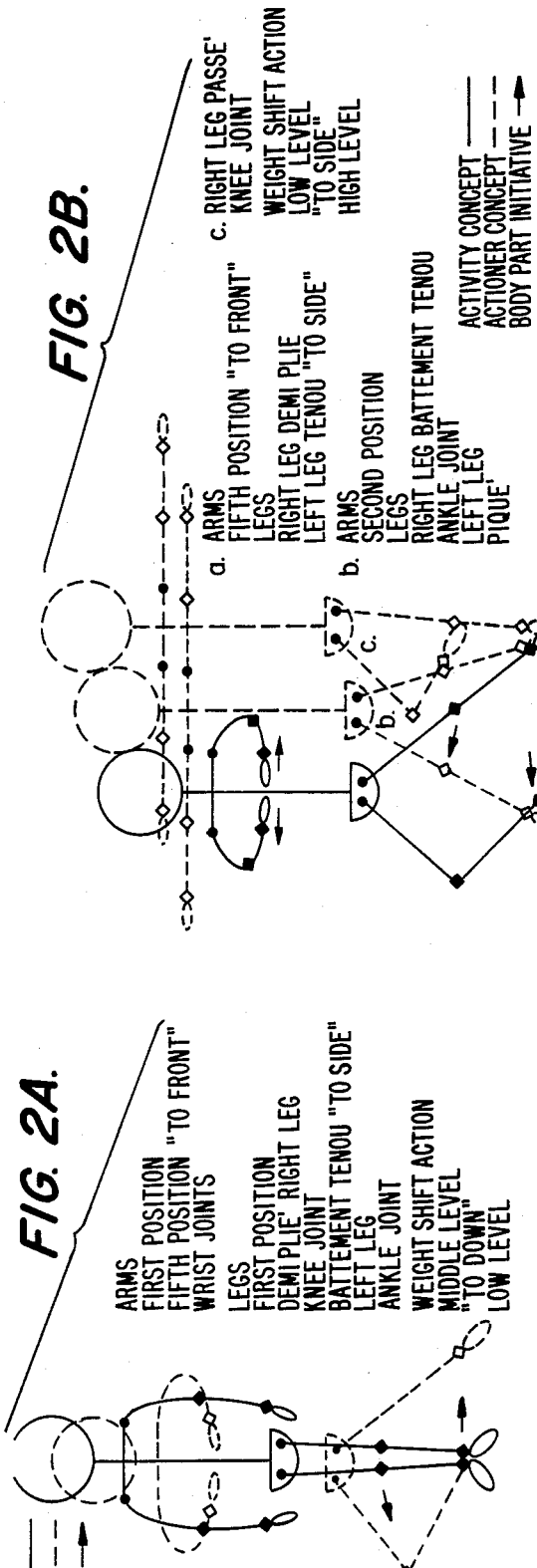
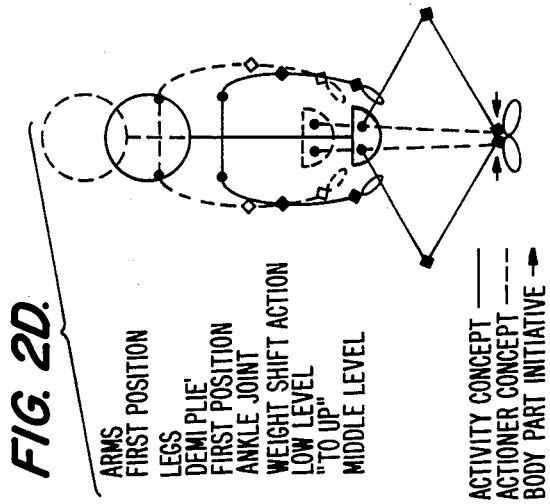
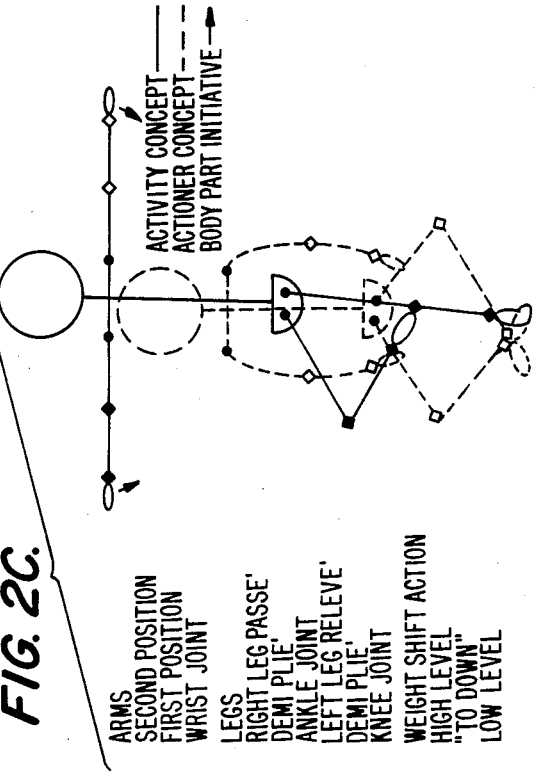

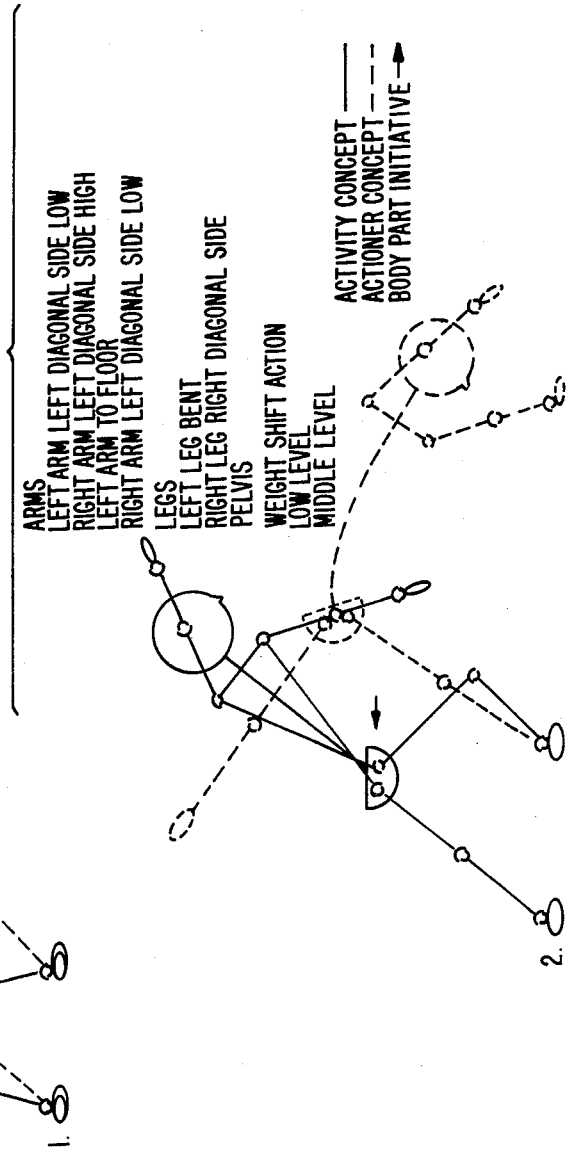
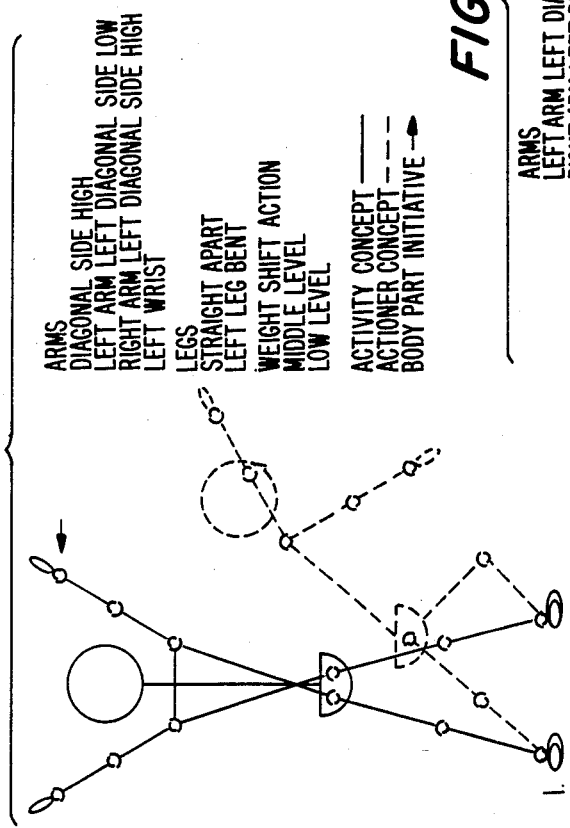
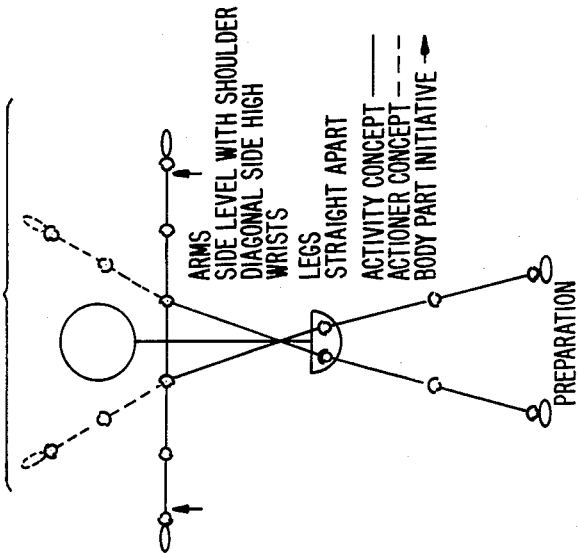

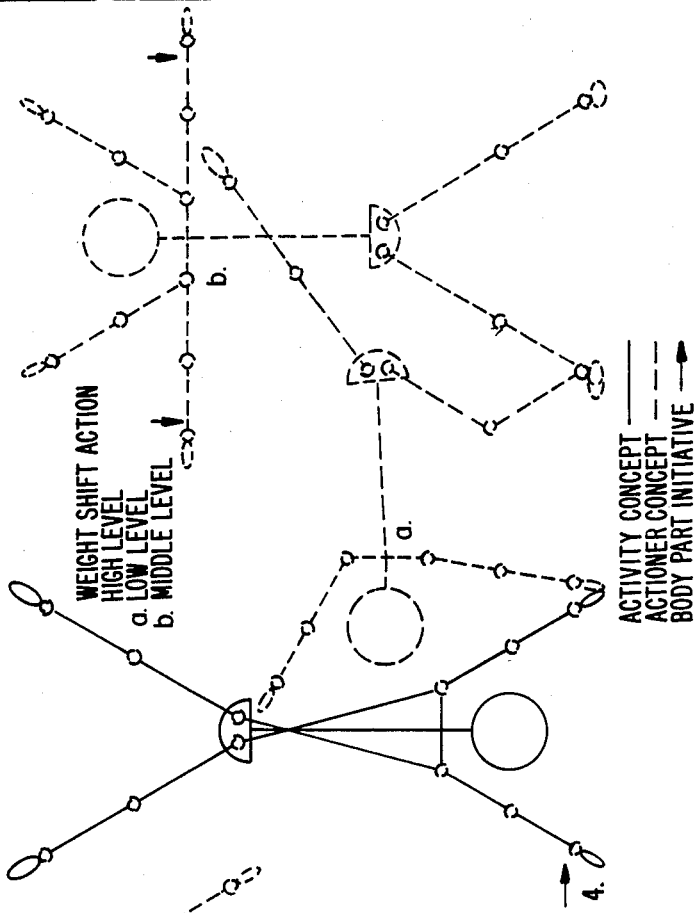

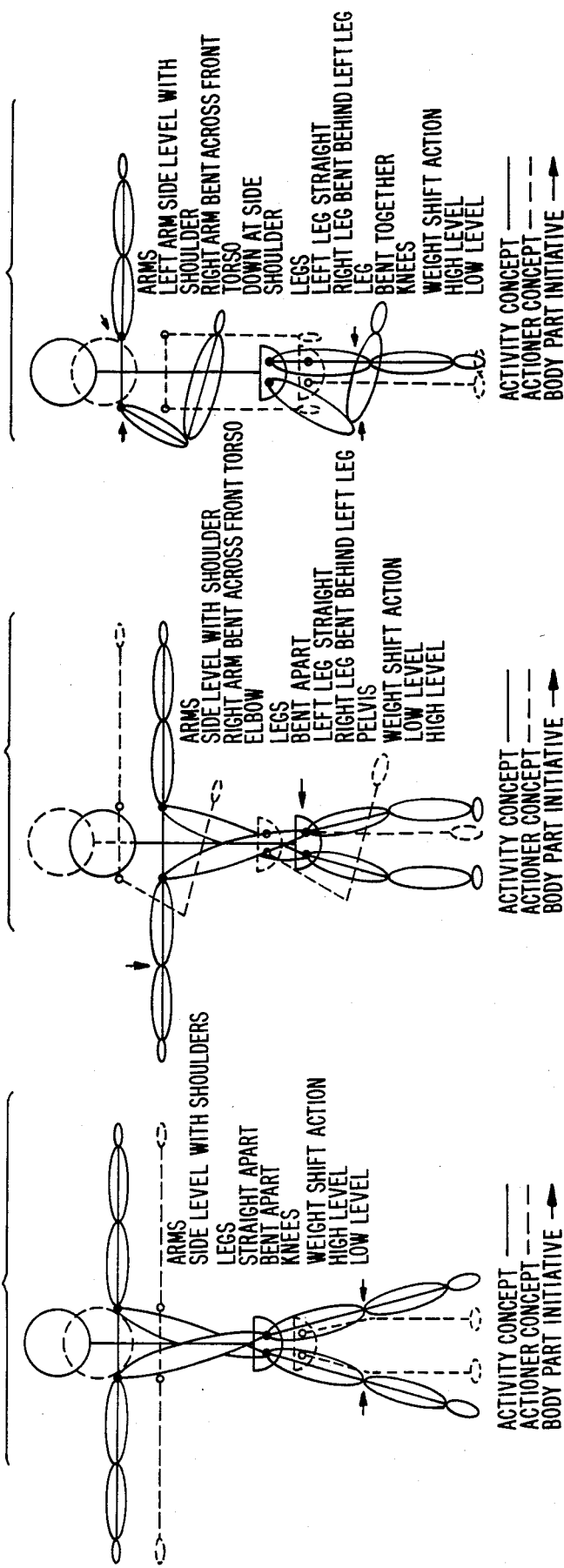

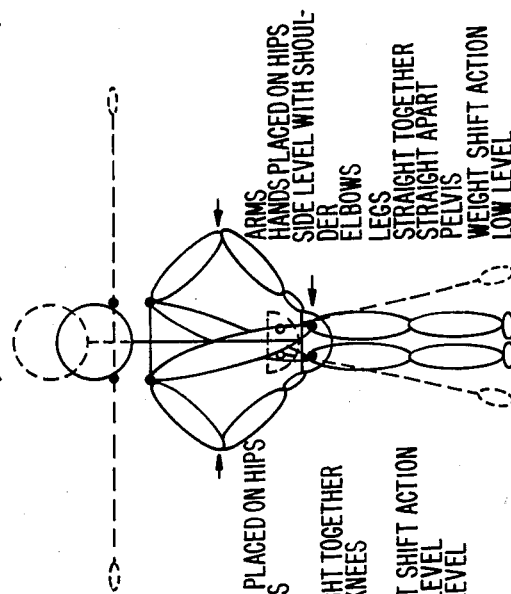
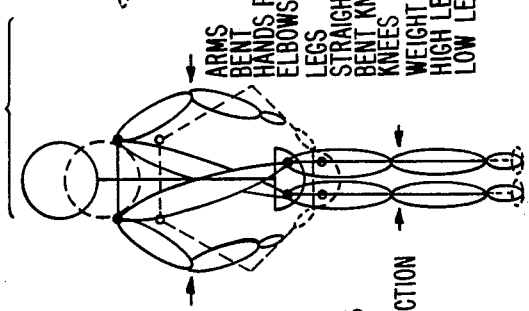
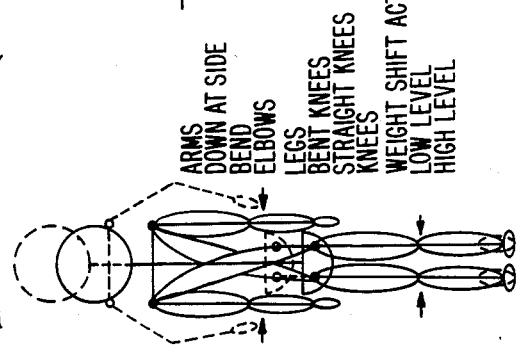
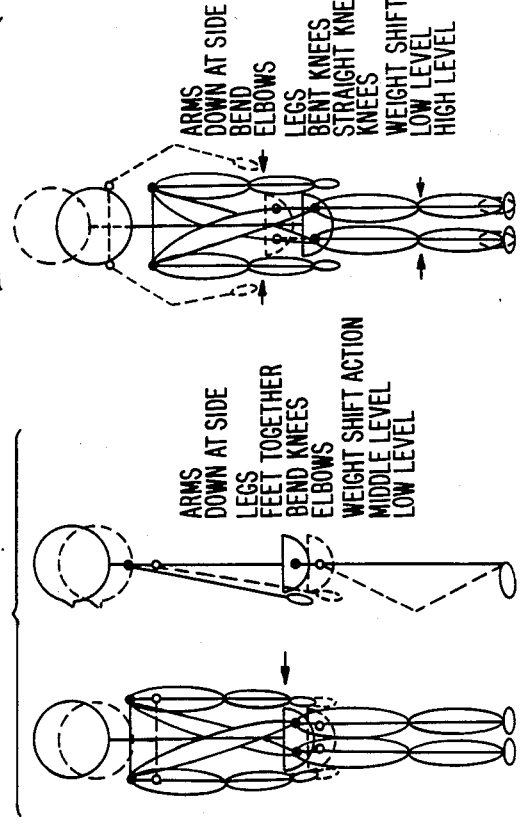

PHYSICAL EDUCATION INSTRUCTIONAL GARMENT

I incorporate by reference herein the disclosure in my U.S. Pat. No. 4,508,510, issued Apr. 2, 1985, directed to physical education in performing various types of movement.

FIELD OF THE INVENTION

The present invention relates in general to the field of physical, especially movement, education and is particularly directed to a garment instructional device depicting a specific kinesthetic sensibility depending upon the specific application for carrying out the patented methods disclosed in my above referenced U.S. Pat. No. 4,508,510.

BACKGROUND OF THE INVENTION

In my said U.S. Patent, I have already pointed out that physical skills involve a coordinated sequence of body parts in arrangement in order to achieve a desired result. There I disclosed training methods which analyze the action characteristics of the subject and, from that analysis, establish an optimal sequence of movements by the subject's particular patterning of body parts. This sensibilities training technique is directly related to psychomotor process through an action language which describes the movement process through perception of action.

Each person's skill in performing a physical task may be classified in one of three prescribed categories of movement or actioning modalities, i.e. crystalline, kinespheric and kinetic. The crystalline actioning modality is characterized by the fact that, in the course of the subject's movement, the patterning of the subject's body parts establishes identifiable geometric designs. The kinespheric actioning modality is characterized by the contouring of movement which describe shapes. The kinetic actioning modality is characterized by effort tonus and temporal phrasing.

SUMMARY OF THE INVENTION

Using the foregoing techniques, I have invented a garment instructional device describing a specific kinesthetic sensibility for each actioning modality form. The particular design on the garment in the form of a coverall leotard or the like which covers arms, legs and torso (i.e. a body leotard) is appropriate to specific applications. For example, a garment for the crystalline form for ballet dancing has markings which represent the joint function and structures of the shoulders, elbows, etc.

It is an object of the present invention to provide a garment in the form of a body leotard with markings appropriate to specifically selected applications.

Another object of my invention is to provide a leotard for the crystalline form which represents the joint function and structures of the elbows, wrists, hips, knees and ankles with the training function by specifically locating the joints anatomically and to determine their function of either ball-and-socket or hinge.

Another object of my invention is to provide an illustrated leotard where, for the crystalline form, circles are used to represent the ball-and-socket joint's confirmation and proprioceptive sensibility.

A further object of my invention is to provide an illustrated leotard where, for the crystalline form, diamonds are used to depict the hinge joints which describe, for example, the direction for ballet's traceform patterning designs.

Yet another object of my invention is to provide an illustrated garment for the crystalline mode in which joint alignment is depicted through specific linear patterns.

A primary objective of my present invention is to greatly facilitate a dance instructor's descriptive dialogue as to what joint initiates, where it is located and how it functions.

Another object of my invention is to provide a garment marked with contouring representations for the kinespheric form having particular application to gymnastics.

Still another object of my invention is to allow a gymnastics student to correlate corresponding psychomotor exteroceptive and proprioceptive sensibilities of shape and contouring for more effective physical skill coordination.

And yet another object of the present invention is to utilize a garment illustrated with oblong shapes for the kinetic form having particular application to aerobic dance.

BRIEF DESCRIPTION OF THE DRAWING

These and further features, objects and advantages of my invention will become more readily apparent from the following detailed description in conjunction with the accompanying drawings which show, for illustrative purposes only, several aspects of my present invention and wherein:

FIGS. 2A through 2D are schematic views of sequences of the Pique Passe beginning ballet movement for the crystalline modality using the garment of FIG. 1;

FIGS. 4A through 4E are schematic views of sequences of a cartwheel gymnastic floor exercise for the kinespheric modality using the garment of FIG. 3;

FIGS. 6A through 6G are schematic views of sequences of an aerobic dance exercise for the kinetic form of actioning modality using the garment of FIG. 5.

DETAILED DESCRIPTION

Figure 1:
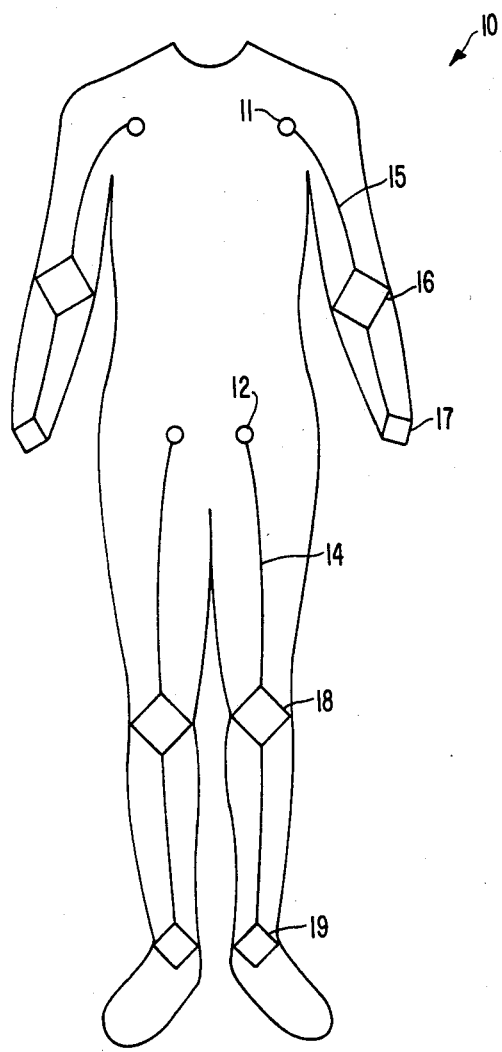
FIG. 1 shows a marked leotard garment according to my invention for the crystalline form of actioning modality and FIG. 1A shows the diamond marking with directions indicated in connection with the garment of FIG. 1.
Figure 1A:
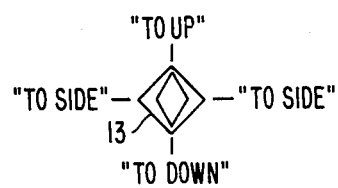

Referring now to the drawings and, in particular, to FIG. 1, there is shown a marked leotard garment designated generally by the numeral 10 for the crystalline form of actioning modality. For simplicity of illustration, I have shown only the markings on the front, although it is also marked in the back as might be seen somewhat more clearly in the knee area. In this particular embodiment of the garment for a specific application, namely ballet dancing movements as shown in FIGS. 2A through 2D, the garment is provided with specific markings which represent the joint function and structures of the shoulders, elbows, wrists, hips, knees and ankles. Circles are used to represent the ball-and-socket joint confirmation and proprioceptive sensibility at the shoulder 11 and the hips 12. Diamonds 13, shown more specifically in FIG. 1A, represent the hinge joints which, in this particular example, describe the direction for ballet traciform patterning designs. The upper point of the diamond shown in FIG. 1A designates "To Up", the lower point designates "To Down", and each of the side points designate "To Side". These expressions will be used in this specification to refer to the various movement positions of the crystalline form actioning modality. Joint alignment is depicted through specific linear patterns such as lines 14 and 15 in FIG. 1.

The training function of the garment shown in FIG. 1 is to locate specific joints anatomically and to determine their function, i.e. ball and socket or hinge. In FIG. 1, the diamonds 13 are shown at the elbow joint hinge 16 and the wrist joint hinge 17 as well as at the knee joint hinge 18 and the ankle joint hinge 19. There are markings on the front and back of the garment and the diamond points shown at the knee hinge joints and ankle hinge joint indicates the ballet dancer's use of outwardly rotated legs. These markings greatly facilitate a dance instructor's descriptive dialogue with a student to describe what joint or joints initiate an action sequence, where the joint is located and whether it functions as a hinge or ball-and-socket. When the dance instructor demonstrates a ballet exercise, the student can specifically observe through a "skeleton-in-action" design abstract and thus determine the appropriate body part sequencing. This "skeleton-in-action" design abstract is perceived through the corresponding psychomotor visual and joint functions depicting only the relevant sensibilities information for body part sequencing to ballet students.

Referring now to FIGS. 2A through 2D, there is shown schematically a sequence of steps in demonstrating a "Pique Passe" for the crystalline form actioning modality using the leotard of FIG. 1. In each sequence, the activity concept is designated in solid lines whereas the actioner concept is designed in dash lines. Arrows designate the body part or joint initiating. In FIG. 2A, the arms are in the first position at the sides (shown in solid lines) and are brought to fifth position "To Front" by wrist joint initiation. The legs in the first position are also designated by solid lines. The right leg is brought to the demi plie position by knee joint initiation. The left leg is brought to the battement tendu "To Side" position through left ankle joint initiation. The body undergoes a "To Down" weight shift action from a middle level position to a low level position.

In FIG. 2B the arms are brought to a second "To Side" position designated by dash lines in the phantom figure b, the right leg is brought to the battement tendu "To Side" position, and the left leg is brought to the pique position. Still referring to FIG. 2B, with the arms remaining in the second position, the right leg is brought to the passe position through knee joint initiation, and the body has a weight shift "To Side" action from the lower level to the higher level as shown in phantom figure c.

Now referring to FIG. 2C, the arms in the second position are brought downwardly to the first position through wrist joint initiation as shown by the dotted lines. The right leg moves from the passe position to the demi plie position through the right angle joint initiation while the left leg moves to the releve demi plie position through the knee joint initiation. The dancers body also goes through a weight shift "To Down" action from the high level to the low level.

Finally, in FIG. 2D, the arms remain in the first position which is also shown in FIG. 2A in solid line while the legs move from the demi plie first position through ankle joint initiation and the body undergoes a weight shift "To Up" action from low level to middle level, arriving back at the position shown in solid line in FIG. 2A.

Figure 3:
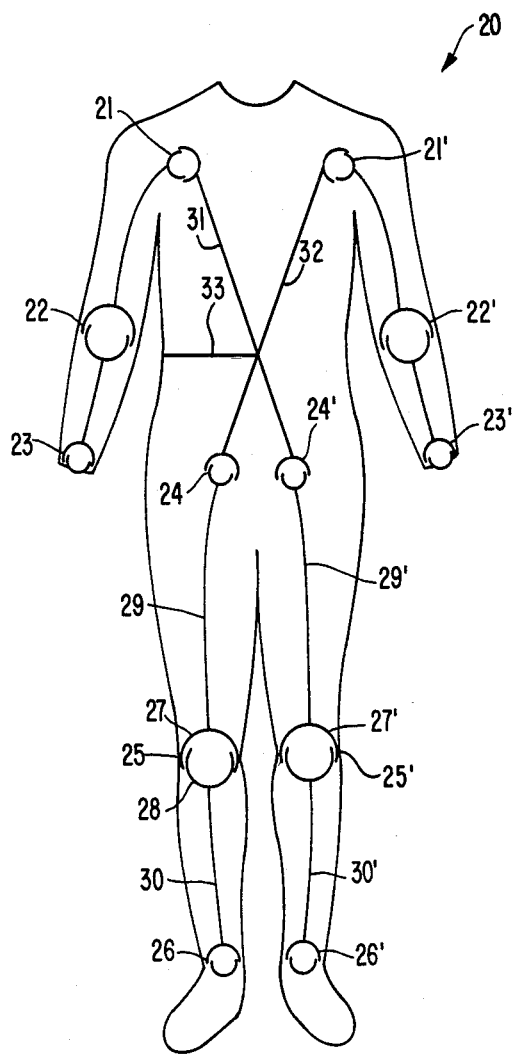
FIG. 3 shows a marked leotard garment according to my invention for the kinespheric form of actioning modality.

I will now use t2he sport of gymnastics to describe my inventive leotard for the kinespheric form. Of course, it should be clearly understood that the leotard is also useful for all other types of sports activities. The leotard shown in FIG. 3 is provided with markings which represent the contouring sensibilities of selected tendons. A contouring representation, each of which is essentially the same in general appearance, is designated by numeral 21. Since tendons connect muscles to bone, their attachments stretch over and around a skeleton's joints. Two cup shapes 27,28, one within the other, represent the location of specifically selected tendons. The overall design kinesthetically conveys the contouring sensibility of the tendons. In this particular example, the tendons represented in the kinespheric leotard overlap the shoulders 21,21', elbows 22,22', wrists 23,23', hips 24,24', knees 25,25' and ankles 26,26'. The cup design 28 of the proximal aspect of the joint inserts into the cup design 27 of the distal aspect of each selected joint attachment. This overlapping simulates a tendon's anatomical overlapping attachment structure. As a result, these markings facilitate the descriptive dialogue instructions in terms of which tendons joint initiates a body part sequence and also where it is specifically located. The gymnastic student is then able to correlate the corresponding psychomotor exterior-ceptive and proprioceptive sensibilities of shape and contouring for more effective physical skill coordination.

To assist gymnasts in proportioning the confirmation of their body part shapes, lines 29,29', 30,30', 34,34', 35,35', etc. are drawn indicating the length of the limbs body parts. Diagonal lines 31,32 are also drawn through the torso to connect the right shoulder joint with the left hip joint and the left shoulder joint with the right hip joint. These lines intersect in the center 33 of the torso which is the most important reference point for gymnasts since it is this point around which the body twists and from which the body contours its rounded shapes. It will also be appreciated that the markings can be printed on the front and back of the leotard garment.

Referring now, for purposes of illustration, to the schematic gymnastic cartwheel floor exercise shown in FIGS. 4A through 4E for the kinespheric form, again the activity concept is shown in solid line, the actioner concept is shown in dotted line, and arrows designate the body part initiating. FIG. 4A shows the preparation for the exercise in which the arms start at the side level with the shoulder and the legs are straight and apart. The arms are moved to diagonal side high through wrist initiation. The final position of the body is shown in dotted line in FIG. 4A and in solid line in FIG. 4B. The left arm is now moved to left diagonal side low and the right arm is moved to left diagonal side high by initiation of the left wrist. With the legs straight apart, the left leg bends and the body undergoes weight shift action from middle level to low level.

With the final position shown in dotted line in FIG. 4B and in solid line in FIG. 4C, the left arm is moved to the floor and the right arm is moved to left diagonal side low. The left leg is bent and the right leg is moved to the right diagonal side high through the pelvis initiation while the body weight shifts from low level to middle level. This new position shown in dotted line in FIG. 4C is now shown in solid line in FIG. 4D.

The right arm is now brought to the floor left side while the left arm is brought to the floor right side. The right leg moves from right diagonal side high to left diagonal side high whereas the left leg moves to right diagonal side high through the initiation of the right ankle. The body undergoes a weight shift action from middle level to high level.

Finally, from the dotted position shown in FIG. 4D or the solid position shown in FIG. 4E, the left arm moves to right diagonal side high and the right leg moves back to the floor in bent position while the left leg moves to left diagonal side high. The body undergoes weight shift action from high level to low level. In the phantom figure designated by b in FIG. 4E, the right arm moves to right side and the left arm moves to left side through the left wrist. The left legs moves to floor and the right leg is straightened through initiation of the right ankle. The weight shift of the body is from low level to middle level. Finally, as shown by the phantom lines c in FIG. 4E, the right arm is moved to right diagonal side high and the left arm is moved to left diagonal side high through the wrists.

Figure 5:
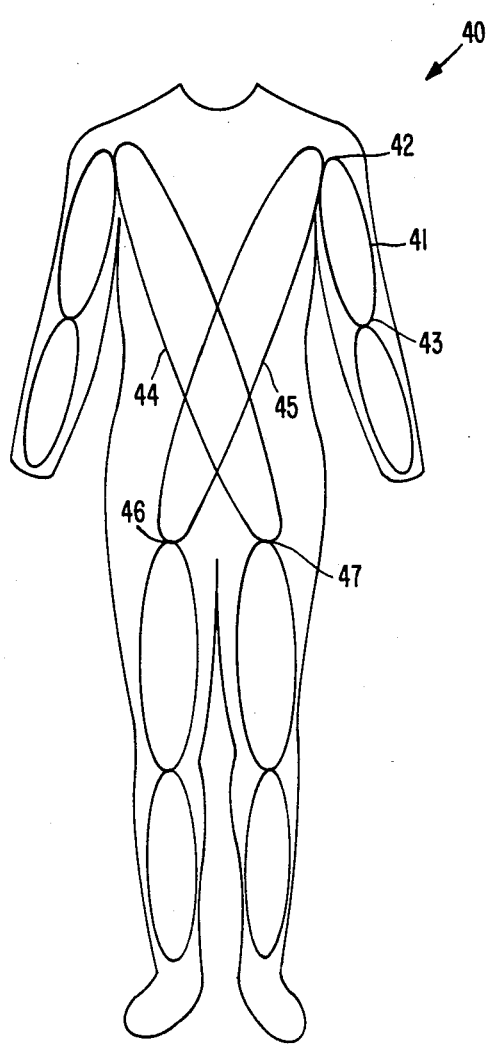
FIG. 5 shows a marked leotard garment according to my invention for the kinetic form of actioning modality.

Turning now to FIG. 5, my invention will now be described with respect to the kinetic actioning modality for application, in this particular illustration, to aerobic dance. Since the kinetic form refers to the proprioceptive sensibilities of muscles, the markings on the unitard designated generally by the numeral 40 specifically describe oblong shapes 41 to represent muscular function. The oblong shape represents the anatomical structure of muscle belly. As shown in FIG. 5, these oblong shapes are drawn on the limbs, namely the upper arm, the lower arm, the thigh and the lower leg of the leotard garment to indicate the origin of a particular muscle group as well as to give definition and to designate a specific body part.

The narrow end of each oblong shape, e.g. the narrow end 42 of the oblong shape on the upper arm, indicates that muscles origin or proximal aspect of the body part while the rounded end 43 designates the distal aspect of that body part. Two oblong shapes 44, 45 are also drawn on the torso in diagonal fashion to represent the limbs' quadrilateral body part patterning of the basic aerobic jog. These oblong shapes are symmetrically oblong and are drawn from the shoulder joints across to the opposite hip joints 46, 47, respectively.

Weight shifting of an exercise such as an aerobic jog when moderated through the center of weight infers a quadrilateral rhythm for the aerobic dancers body part patterning that is based on the dynamics and sequencing according to the kinetic form. The oblong shapes 41 can be colored to contrast with the background of the garment. It will be understood, of course, that the leotard garment for the kinetic form can be produced in many color combinations to enhance the visual dynamics of the exercise such as will occur in an aerobic dance class.

Turning now to FIGS. 6A through 6G, there is schematically shown an aerobic dance exercise for the kinetic form of actioning modality. FIG. 6A shows the preparation in both front and side view. The exercise begins with the arms down at the side, the legs and feet together. The knees are bent through initiation at the pelvis with a consequent weight shift action from middle level to low level. Turning now to FIGS. 6B with the arms still down at the side, the arms are bent sideways through elbow initiation and the bent knees are brought to a straight position through knee initiation with a weight shift action from low level to high level. As now shown in FIG. 6C, the hands are placed on the hips through elbow initiation and the straight legs are now bent at the knees through knee initiation with a consequent weight shift action from high level to low level.

Referring now to FIG. 6D, the arms with the hands placed on hips are now moved to the side level with the shoulder through elbow initiation and the legs which are straight together are moved straight apart through pelvis initiation with a weight shift action from a low level to high level. From this position which is also shown in solid line in FIG. 6E, the legs are bent apart at the initiation of the knees with a weight shift action from high level to low level. From this position, as shown in FIG. 6F, the right arm is bent across the front torso through right elbow initiation, the left leg is moved straight and the right leg is bent behind the left leg through pelvis initiation with a consequent weight shift action from low level to high level. Finally, as shown in FIG. 6G, the arms are brought down to the side through shoulder initiation and the right leg is brought to the straight position with the knees bent through knee initiation with a weight shift action from high level to low level.

From the foregoing descriptions, it will be readily seen that the various actioning modalities can be easily demonstrated for selected applications for instructional purposes. The student can observe through an "anatomy-in-action" design abstract and determine the appropriate body part sequencing depending upon the particular actioning modality involved.

While I have shown and described several embodiments in accordance with my invention, it is to be clearly understood that the same is not limited to the details shown and described herein but is intended to cover all such changes and modifications as are encompassed by the scope of the appended claims.

I claim:

1. An instructional garment comprising material configured to body limbs and torso and adapted to cover said limbs and torso in close fitting relationship, and means on said material depicting characteristics of parts of the body in accordance with the psychomotor sensibilities of the actioning modality of the crystalline form, for which the proprioceptive sensibility comprises prescribed geometrical markings in the area of one of more of the elbow joints, wrist joints, knee joints, ankle joints, hip joints and shoulder joints and the exteroceptive sensibiltiy is represented by lines connecting the geometric markings of the joints which, when moving, depict a gestural design configuration of the crystalline form.

2. An instructional garment according to claim 1, wherein said markings further comprise additional markings in the area of the hips and shoulders.

3. An instructional garment according to claim 2, wherein said additional markings include circle-like markings.

4. An instructional garment according to claim 1, wherein said markings and lines are provided on the front and back of the torso and limbs.

5. An instruction garment according to claim 1, wherein said prescribed geometrical markings include diamond-shaped markings.

6. An instructional garment according to claim 5, wherein said additional markings include circle-like markings.

7. An instructuional garment comprising material configured to body limbs and torso and adapted to cover said limbs and torso in close fitting relationship, and means on said material depicting characteristics of parts of the body in accordance with the psychomotor sensibilities of the actioning modality of the kinespheric form, and comprising prescribed geometrical markings in the area of one or more of the shoulders, elbows, wrists, hips, knees and ankles to represent the location and the contouring proprioceptive sensibility of specific tendons, and lines connecting respective ones of said geometric markings to indicate and outline the shape configurations which represent the exteroceptive sensibility of the kinespheric form.

8. An instructional garment according to claim 7, wherein said prescribed geometrical markings comprise cup-shaped markings.

9. An instructuional garment according to claim 7, wherein said cup-shaped is represented by one cup-shape inverted inside another cup-shape.

10. An instructional garment according to claim 9, wherein the one cup-shape represents a joint proximal aspect, and the other cup-shape represents a joint distal aspect.

11. An instructional garment according to claim 10, wherein said lines includes lines which connect the cup-shape representing the joint proximal aspect at one point on the garment with the cup-shape representing the joint distal aspect at another point on the garment.

12. An instructional garment according to claim 9, wherein said lines include lines which connect a cup-shaped marking at a shoulder area on one side of the torso with a cup-shaped marking at a hip area on the other side of the torso.

13. An instructional garment according to claim 12, wherein said lines includes lines which connect a cup-shaped marking at a shoulder area at the other side of the torso with a cup-shaped marking at a hip area on the one side of the torso such that the respective lines intersect in the center of the torso.

14. An instructional garment according to claim 8, wherein said lines includes lines which connect the cup-shaped markings on at least one of said limbs.

15. An instructional garment according to claim 7, wherein said marking and lines are provided on the front and back of the torso and limbs.

16. An instruction garment comprising material configured to body limbs and torso and adapted to cover said limbs and torso in close fitting relationship, and means on said material depicting characteristics of parts of the body in accordance with the psychomotor sensibilities of the actioning modality of the kinetic form, and comprising prescribed shaped markings on the torso and limbs, which represent the proprioceptive sensibility of exertion/recuperation effort rhythms of muscle contractivity, with the ends of the shapes indicating the proximal and distal aspects of the body parts and designating body parts used as units in phrasing the exteroceptive temporal rhythms for body part sequencing indicated in the kinetic form.

17. An instructional garment according to claim 16, wherein said shapes comprise oblong loop shapes on the torso and limbs, the ends of which represent proximal and distal body parts.

18. An instructional garment according to claim 17, wherein a plurality of oblong loop shapes are provided on at least one of the limbs.

19. An instructional garment according to claim 17, wherein a plurality of ablong loop shapes are provided on the torso.

20. An instructional garment according to claim 19, wherein the oblong loop shapes are arranged diagonally on the torso and criss-cross each other.

21. An instructional garment according to claim 17, wherein an oblong loop shape extends from a shoulder on one side of the torso to a hip joint on the other side of the torso.

22. An instructional garment according to claim 21, wherein the oblong loop shape extends from a shoulder at the other side of the torso to a hip joint on the one side of the torso.

23. An instructional garment according to claim 16, wherein said shapes are provided on the front and back of the torso and limbs.

* * * * *